United States Patent
Koch

(10) Patent No.: US 6,168,749 B1
(45) Date of Patent: Jan. 2, 2001

(54) METHOD OF MANUFACTURING CONTAINERS

(75) Inventor: Michael Koch, King City (CA)

(73) Assignee: Krupp Corpoplast Maschinenbau GmbH, Hamburg (DE)

( * ) Notice: Under 35 U.S.C. 154(b), the term of this patent shall be extended for 0 days.

(21) Appl. No.: 09/077,779
(22) PCT Filed: Nov. 16, 1996
(86) PCT No.: PCT/DE96/02212
   § 371 Date: Jun. 1, 1998
   § 102(e) Date: Jun. 1, 1998
(87) PCT Pub. No.: WO97/20677
   PCT Pub. Date: Jun. 12, 1997

(30) Foreign Application Priority Data

Dec. 2, 1995 (DE) ............................. 195 45 024

(51) Int. Cl.$^7$ .......................... B29C 49/08; B29C 49/10
(52) U.S. Cl. ............................. 264/529; 264/532
(58) Field of Search .................... 264/529, 532

(56) References Cited

U.S. PATENT DOCUMENTS

| 4,421,711 | * | 12/1983 | Bonnebat et al. | 264/529 |
| 4,427,360 | | 1/1984 | Albrecht et al. | |
| 4,512,948 | * | 4/1985 | Jabarin | 264/529 |
| 5,474,735 | * | 12/1995 | Krishnakumar et al. | 264/529 |
| 5,888,598 | * | 3/1999 | Brewster et al. | 264/532 |

FOREIGN PATENT DOCUMENTS

| 3815193 A1 | 11/1989 | (DE) . |
| 4033531 A1 | 5/1992 | (DE) . |
| 4113874 A1 | 10/1992 | (DE) . |
| 4123933 A1 | 1/1993 | (DE) . |
| 4212583 A1 | 10/1993 | (DE) . |
| 4340291 A1 | 6/1995 | (DE) . |
| 0 304 885 | 9/1989 | (EP) . |
| 0 379 264 | 7/1990 | (EP) . |
| 2182183 | 12/1973 | (FR) . |
| 2550990 | 3/1985 | (FR) . |
| WO 95/08430 | 3/1995 | (WO) . |

* cited by examiner

Primary Examiner—Jan H. Silbaugh
Assistant Examiner—Suzanne E. McDowell
(74) Attorney, Agent, or Firm—Harness, Dickey & Pierce, P.L.C.

(57) ABSTRACT

The process serves the purpose of producing containers. A heated pre-form made of a thermoplastic material is stretched and inflated with the aid of a gas under pressure for purposes of molding the container. The inflating process is divided into a preliminary blowing period with a gas under a lower level of pressure and into a subsequent primary blowing period with a gas under a higher pressure level. The ratio of the container diameter to the inner diameter is selected to be greater than 4.0. The pre-form has a median wall thickness of greater than 3 millimeters and at least at the beginning of the preliminary blowing phase is provided with a material temperature greater than 70 degrees Celsius. The pre-form at least at the beginning of the preliminary blowing phase in the area to be oriented is provided in the area of its upper surface with a temperature which is at a maximum equal to a medium temperature of the inner surface of the pre-form in the area to be oriented. The temporal duration of the preliminary blowing phase is selected to be less than 1.0 second. During the preliminary blowing phase the pre-form is expanded to at least 50 percent of the volume intended for the finished blown container.

16 Claims, 7 Drawing Sheets

METHOD OF MANUFACTURING CONTAINERS

BACKGROUND AND SUMMARY OF THE INVENTION

The present invention relates to a process for producing container, in which process a heated pre-form made of thermoplastic material is stretched and blown up with the aid of a gas under pressure and in which process the blowing up process is divided into a preliminary blowing phase with a gas under a lower pressure level and to a subsequent primary blowing phase with a gas under a higher level of pressure.

Such a process is described, for example, in DE-OS 43 40 291. Possibilities for controlling the varying pressure are given in DE-OS 41 13 874. A device for carrying out the process is described in DE-OS 42 12 583.

In such processes and with such devices variously shaped pre-forms, depending on the particular use intended, can be reshaped into containers and in particular into bottles. The contours of the container can be varied within very wide bounds.

One pre-form with a wall thickness changing by steps is known in the art from EP-OS 0 379 264. Here the outer limit of the pre-form wall thickness runs essentially parallel to a longitudinal axis and the interior wall thickness is thickened by steps in an area facing the ground. A pre-form with an essentially uniform wall thickness in the direction of its longitudinal extensions is described in DE-OS 40 33 531. A special variant for heating a pre-form with approximately uniform wall thickness is described in DE-OS 42 23 933.

Containers made from such pre-forms can have various characteristics and application. Known in the art are both single-use containers and refillable containers. In addition, containers are known in the art that can withstand increased temperatures when being filled, for example, during the washing processes.

Such a container can be shaped, for example, in such a manner that first a pre-form is produced from polyethylene terephthalate (PET) through injection molding, heated following an interstratification of the pre-form and then fed into the blowing station. But it is also known in the art to produce containers following the spray-blowing process, in which the pre-form, without an intervening heating up, can be fed into the blowing station immediately after being produced and after a sufficient stability has been achieved. Finally, it is also known in the art to produce pre-forms from tube segments, which are sealed off in the region of their end and are provided with a suitable mouth at their other end.

Common to all of the processes is that fact that the pre-form has essentially a smaller shape than the container to be produced. The pre-form for this reason inside the blowing station is charged with compressed air to transform it into the container intended to be produced. In this inflating process the material is oriented, in addition to a narrowing of the wall thickness owing to an expansion of the surface. This causes the thin wall of the container to have a very high wall stability, which makes the container suitable for a variety of uses.

Various processes for carrying out the blowing process are known in the art. For one thing, it is possible to use a uniform blowing pressure which is introduced into the pre-form to be inflated and which is deflated after being sufficiently formed from the finished container against surrounding pressure. It is also known in the art first to cause a preliminary expansion of the preforms which already approximates the form of the container to be produced relatively close with a lower pressure and only then to shape the finer contour of the container using a higher pressure. In this process the compressed air is also not deflated against surrounding pressure after the container has been produced.

The shaping of pre-forms previously known in the art cannot satisfy all requirements for the distribution of materials placed on manufactured containers. Geometry and tempering of the pre-form essentially influence the material distribution in blown containers. For reasons of costs, wall thickness' as slight as possible are striven for, which, owing to a very high bi-directional orientation still have a high tensile strength. In addition, it is attempted to have a uniform wall thickness in the area of the lateral wall of the container, and the goal is to have as little non-oriented material as possible in the area of the bottom of the container. Non-oriented material left in an amorphous tends to crack and thus impairs the durability of the container.

Material not required from a technical standpoint in the area of the bottom has the consequence of additional costs from the requisite use of materials, which with high production figures can run into large amounts. On the other hand, sufficient material must be present to allow for forming a standing ring or foot for the blown containers in the area of the foot of the pre-form and must be provided to shape the intended contour as conditioned by the maximum extension possible.

The process sequences known in the art for tempering the pre-form for carrying out the inflating and orientating process, especially in the production of small containers, can still not fulfill all requirements placed for long-lasting storage stability for the beverages filled into the containers. With smaller bottles there is a relatively unfavorable ratio between surface size to inner volume. Because of the material properties of many thermoplastic plastics, this causes carbon dioxide to escape from beverages containing this or oxygen to be absorbed by the fluid. Also, properties of permeability against other materials, as for example with aromatic materials, can be present.

Processes known in the art for improving barrier properties will employ, for example, multi-layer pre-forms, in which one or several layers will have special properties for lessening gas permeability. However, the multi-layer pre-forms are, for one thing, expensive and, for another, reduce the possibilities for recycling because of the combination of materials. It is also known in the art, for example to use co-polymers or blends of PET and PEN.

The task of the present invention, accordingly, is to improve a process of the type described above in such a manner that the properties of the containers produced can be improved in respect of the storage stability of the filling product without any significant increase in cost.

The task is solved in keeping with the present invention by selecting the ratio of the diameter of the container to the inner diameter of the pre-form to be more than 4.0; by letting the pre-form have a median wall thickness of greater than 3 millimeters, by providing a material temperature in the orientation area greater than 70 degrees Celsius, at least at the beginning of the preliminary blowing phase; by letting the pre-form, at least at the beginning of the preliminary blowing phase, have a medium temperature at its outer surface in the area to be oriented, which is equal to a medium temperature of the inner surface of the pre-form in the area to be oriented; by selecting a temporal duration of the preliminary blowing phase of less than 1.0 second and by expanding the pre-form to at least 50 percent of the volume intended for the finished blown container during the preliminary blowing phase.

The actual choice of the medium wall thickness of the pre-form is made in dependence on the actual size of the container and especially in dependence on the volume of the container.

The combination of pre-form dimensions selected in dependence on the dimensions of the container, the choice of temperature relative to the temporal sequence of the expansion process, the temperature distribution in the pre-form and the temporal coordination of the preliminary blowing phase and the primary blowing phase relative to the respective volume of an interim product causes the end product to show significantly improved properties because of the material properties achieved relative to the state of the art to reduce gas permeability. Significant improvements can be realized especially in combination with a suitable choice of thermoplastic material. It has been shown by technical measuring relating to the permeability of carbon dioxide, for example, that with an experimental charging of containers over a period of 10 weeks the loss of carbon dioxide was less than 15 percent of the quantity of carbon dioxide contained in the bottled liquid.

BRIEF DESCRIPTION OF THE DRAWINGS

In the drawings various embodiments of the present invention are shown.

DESCRIPTION OF THE PREFERRED EMBODIMENT

Figure 1:
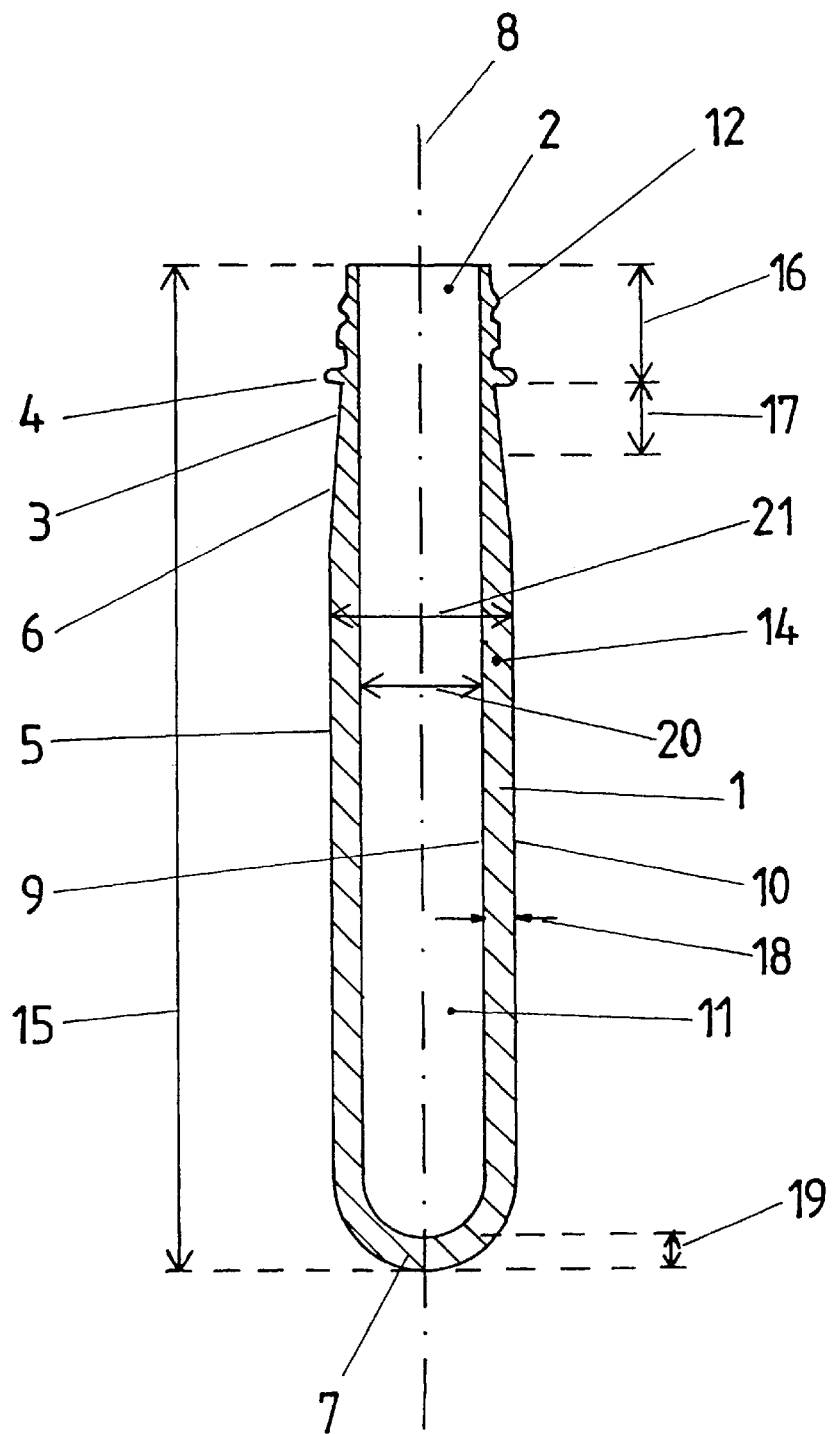
FIG. 1 is a diametric section view of a pre-form, the section being taken along the longitudinal axis thereof.

A pre-form (1) as seen in the embodiment shown in FIG. 1 consists of a mouth section (2), a protective ring (4) separating the mouth section (2) from a collar area (3), a shoulder area (6) transitioning from the collar area (3) into a wall section (5), as well as a bottom (7). The protective ring (4) overhangs the mouth section (2) at right angles to a longitudinal axis (8). In the region of the shoulder area (6) the outer diameter of the pre-form (1) grows wider starting from the collar area (3) in the direction of the wall section (5). In a container (13) to be produced from a pre-form (1) the wall section (5) essentially forms the side wall of the container. The bottom (7) is round in shape.

The mouth section (2) can, for example, be formed with an external screw tread (12) that makes it possible to apply a screw top to the finished container (13). But it is also possible to form the mouth section (2) with an outer bulge to create a working surface for a crown cork. In addition, any number of additional embodiments are conceivable to make it possible to apply various types of plug sealers.

It may be seen from the illustration in FIG. 1 that the wall section (5) has an inner surface (9) as well as an outer surface (10). The inner surface (9) delimits the inner space (11) of the pre-form (1).

In the shoulder area (6) the thickness of a pre-form's wall (14) can stretch, extending from the collar area (3) in the direction toward the wall area (5), with increasing wall strength. The pre-form (1) has a pre-form length (15) in the direction of the longitudinal axis (8). The mouth area (2) and the protective ring (4) extends in the direction of the longitudinal axis (8) with a mouth length (16) held in common. The collar area (3) has a collar length (17) in the area of the longitudinal axis (8). The pre-form (1) preferably has a constant wall thickness over the length of the collar area (3).

In the wall area (5) the pre-form (1) has a wall thickness (18) and a bottom thickness (19) will be encountered in the bottom area (7). The pre-form (a) can be given a further dimension with the aid of an inner diameter (20) and an outer diameter (21) which are measured in the wall area (5).

Figure 2:
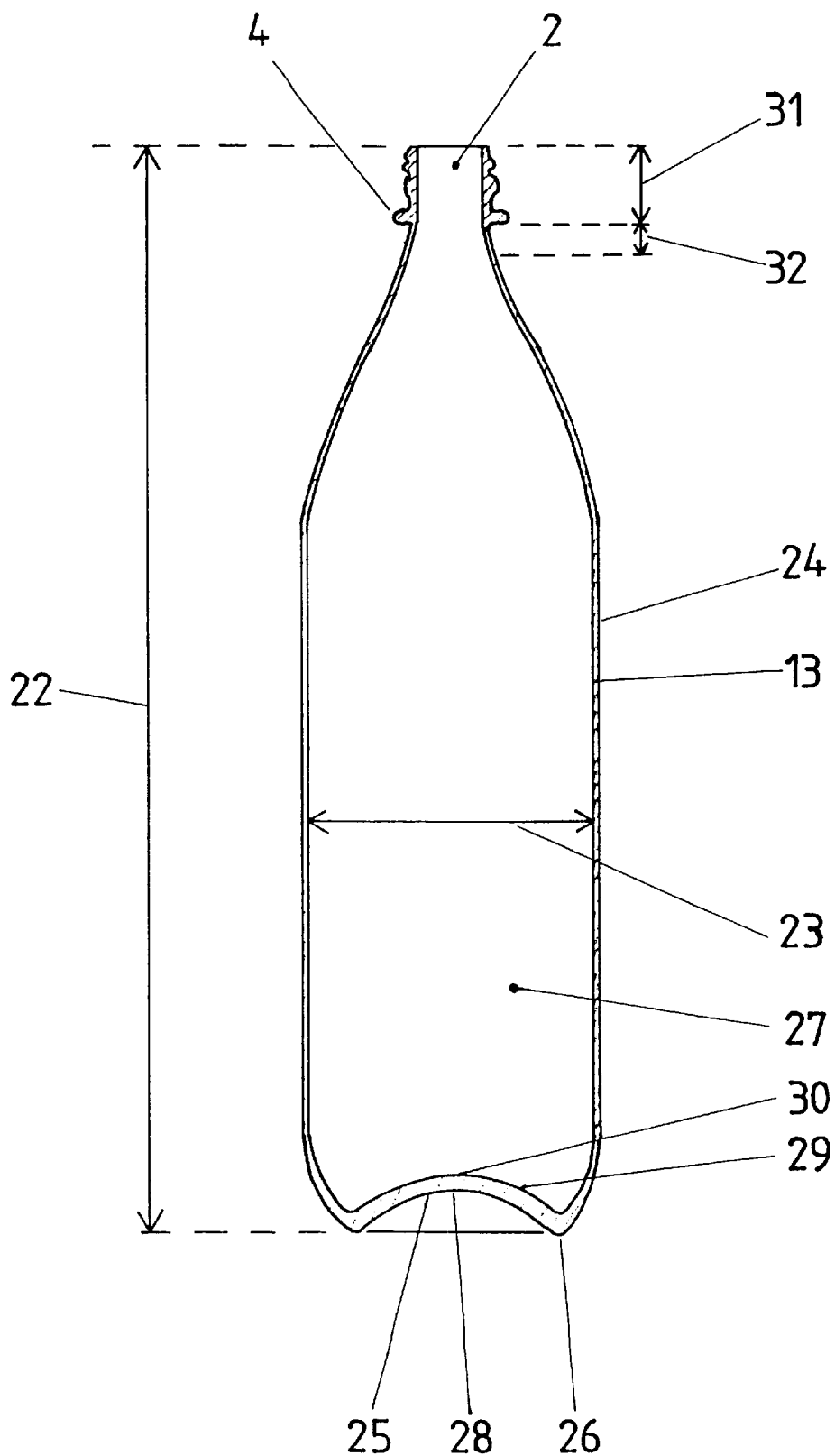
FIG. 2 is a diametric section view through a container in the shape of a bottle, the section also being taken along the longitudinal axis thereof.

In the bottle-shaped container (13) shown in FIG. 2 the essentially unchanged mouth area (2) and the protective ring (4) are encountered. The further area of the container (13) is expanded by the biaxial orientation carried out in both its traverse direction and in its longitudinal direction relative to the pre-form (1). Thereby, the container (13) shows a container length (22) and a container diameter (23), which should not differ in respect of its outer diameter or its outer diameter in view of the exactness which must be taken into account in the following.

FIG. 2 shows, among other things, the bottom area of the blow-formed container (13). The container (13) has a side wall (24) and a container bottom (25). The container bottom (25) consists of a standing ring (26) and a dome (28) arching inward in the direction toward the inner space of the container (27). The dome (28) is formed by the dome slope (29) and a center (30).

The container (13) has a container mouth length (31) and a container collar length (32), for which purpose at least the container mouth length (31) is substantially the same as a rule as the mouth length (16) of the pre-form (1).

Heating the pre-form (1) prior to the orientation process can be conceived of in different variations. When a tunnel-like heating segment is used, tempering is solely dependent on the tarrying time. But it is also conceivable to use heat radiators which charge the pre-form (1) with infra-red or high frequency radiation. Using such radiators it is possible to generate a temperature profile in the area of the pre-form (1) in the direction of the longitudinal axis (8).

If such a heat radiator is formed of several heating elements that can be controlled independently of one another and which are situated one over the other in the direction of the longitudinal axis (8), a higher heating energy can be irradiated in the thickened area of the wall area (5) in the area of the upper extension of the pre-form (1) in the direction of the mouth section (2) by a more intensive control of the heating elements than in the area of the wall section (5) facing the bottom (7). Solely with uniformly controllable heat radiators such a heat profiling can also be realized through situating the heating elements at various intervals in the direction of the longitudinal axis (8).

Figure 3:
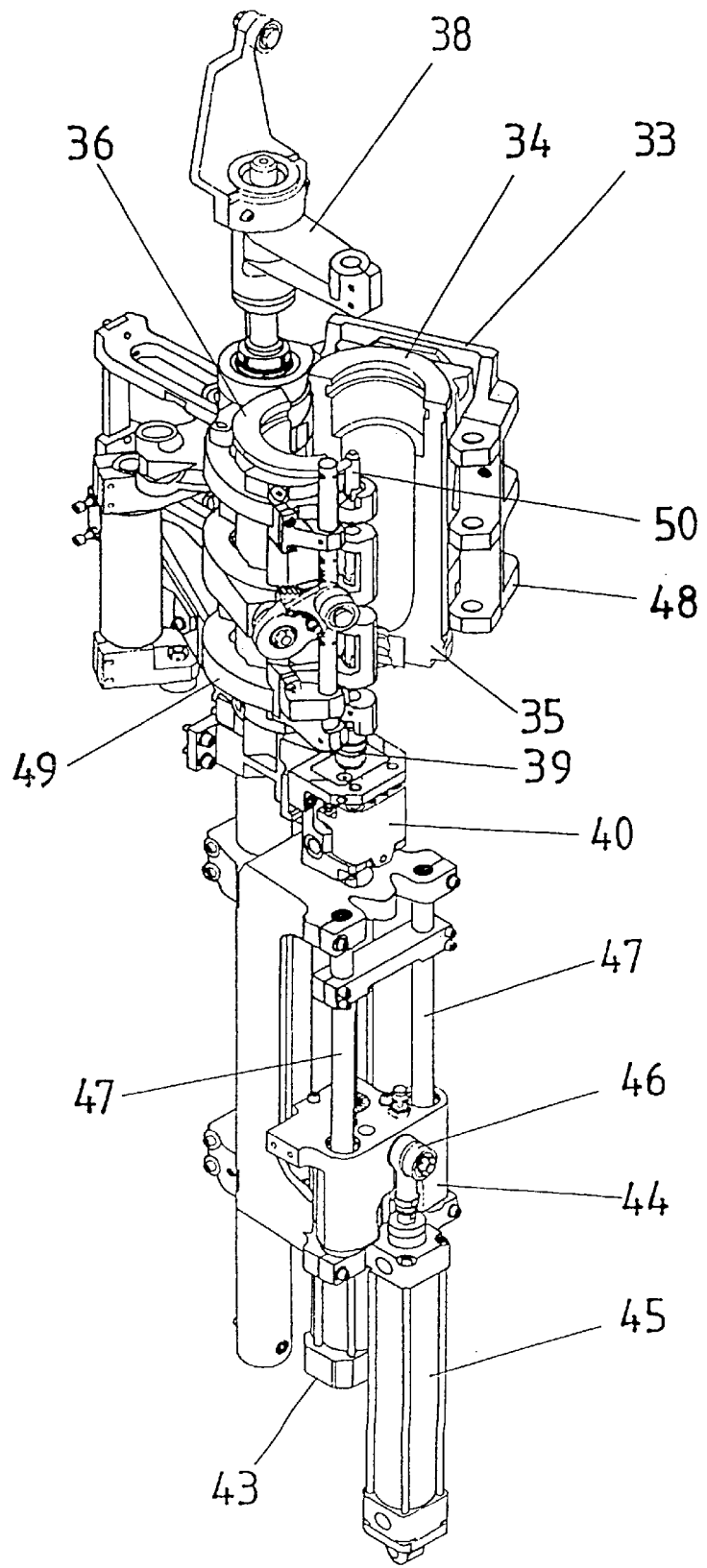
FIG. 3 is an illustration in perspective of a blowing station for producing containers from pre-forms.
Figure 4:
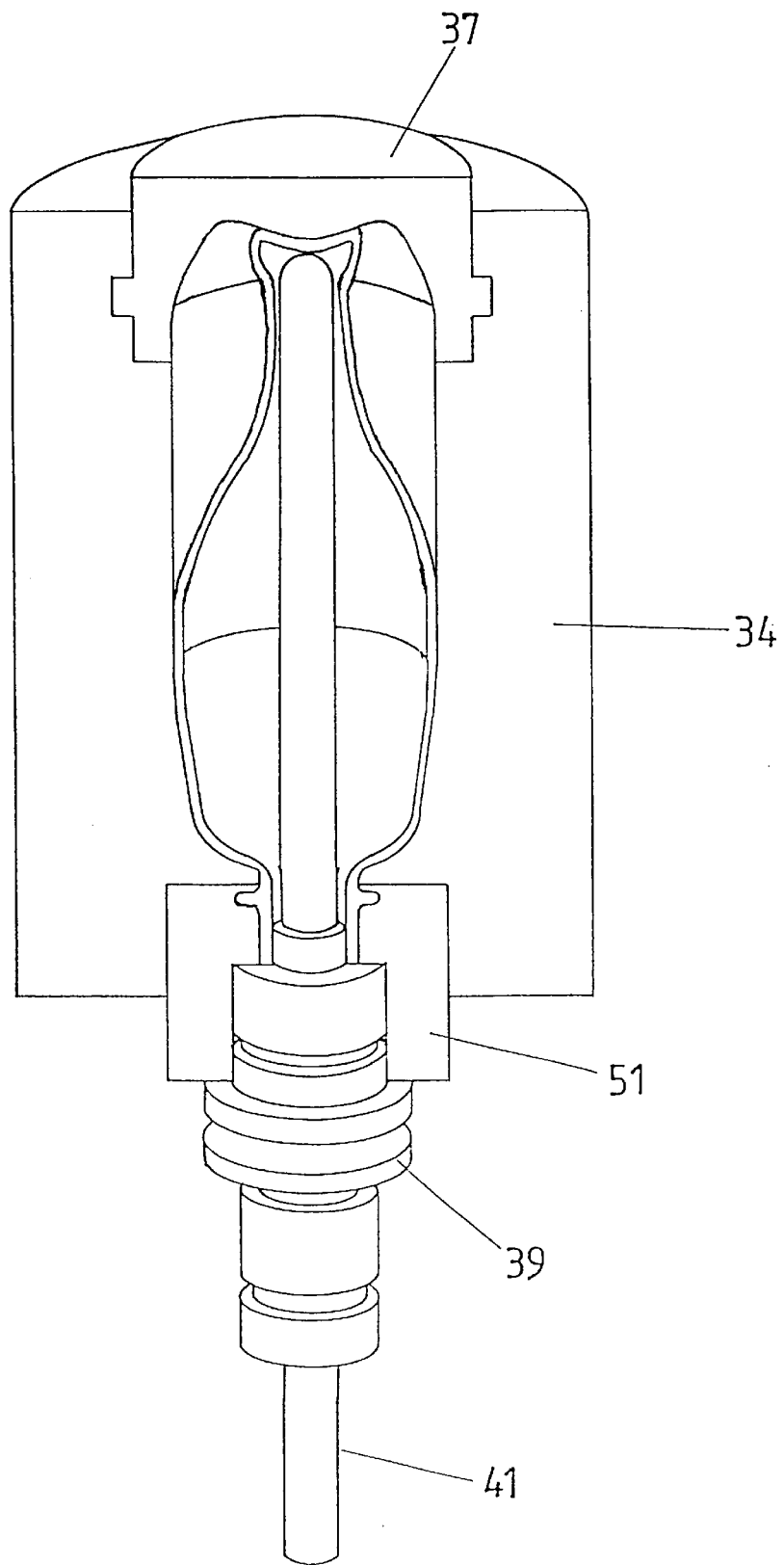
FIG. 4 is a longitudinal section view of a blow mold in which a pre-form is shown being stretched and expanded.

The principal design of a device for reshaping the pre-form (1) into the container (13) is shown in FIG. 3 and in FIG. 4

The device for shaping the container (13) essentially consists of a blowing station (33) which is equipped with a blow mold (34) into which the perform (1) can be inserted. The pre-form (1) can be an injection molded part made of polyethylene terephthalate. To make it possible for the preform (1) to be inserted into the blow mold (34) and to make it possible for the finished container to be extracted, the blow mold (34) consists of mold halves (35, 36) and a bottom portion (37), (shown in FIG. 4) which can be positioned by a lifting device (38). The pre-form (1) can be held in the area of the blowing station (33) by a transport pin (39) which in common with the pre-form (1) passes through a multiplicity of treatment stations within the device. But it is also possible to insert the pre-form (1), into the blow mold (34) for example, by means of pincers or other means.

To make it possible to feed the compressed air, a connecting piston (40) is located beneath the transport pin (39) which supplies compressed air to the pre-form (1) and simultaneously undertakes a thickening relative to the transport pin (39). In an altered structure, however, it is essentially also conceivable to use dedicated compressed air supplies.

Stretching of the pre-form (1) is accomplished by means of a stretching rod (41) (shown in FIG. 4), which is positioned by a cylinder (42). But it is also essentially conceivable to carry out the mechanical positioning of the stretching rod (41) by means of curved segments, which are acted on by tapping rolls. The use of curve segments is especially practical when a series of blow stations (33) are situated on a rotating blowing wheel. It is useful to use cylinders (42) when stationary blow stations (33) are provided.

In the embodiment shown in FIG. 3 the stretching system is designed in such a manier that a tandem arrangement of two cylinders (42) is made available. The stretching rod (41) is first driven prior to the beginning of the actual stretching process by the primary cylinder (43) up to the area of the bottom (7) of the pre-form (1). During the actual stretching process the primary cylinder (43) is positioned with extended stretching rods together with a carriage (44) bearing the primary cylinder (43) by a secondary cylinder (45). It is intended that the secondary cylinder (45) be steered in a curve in such a manner that the actual stretching position will occur by means of a guide roller (46) gliding along a curved path during the execution of the stretching process. The guide roller (46) is pressed against the guide track by the secondary cylinder (45). The carriage (44) glides along two guiding elements (47).

After the form halves (35, 36) situated in the area of carriers (48, 49) have been closed, the carriers (48) interlock relative to one another with the aid of a locking mechanism (50).

In order to adapt to different forms of the mouth section (2), the use is shown in FIG. 4 of separate forms (51) in the lower region of the blow mold (34).

Figure 5:
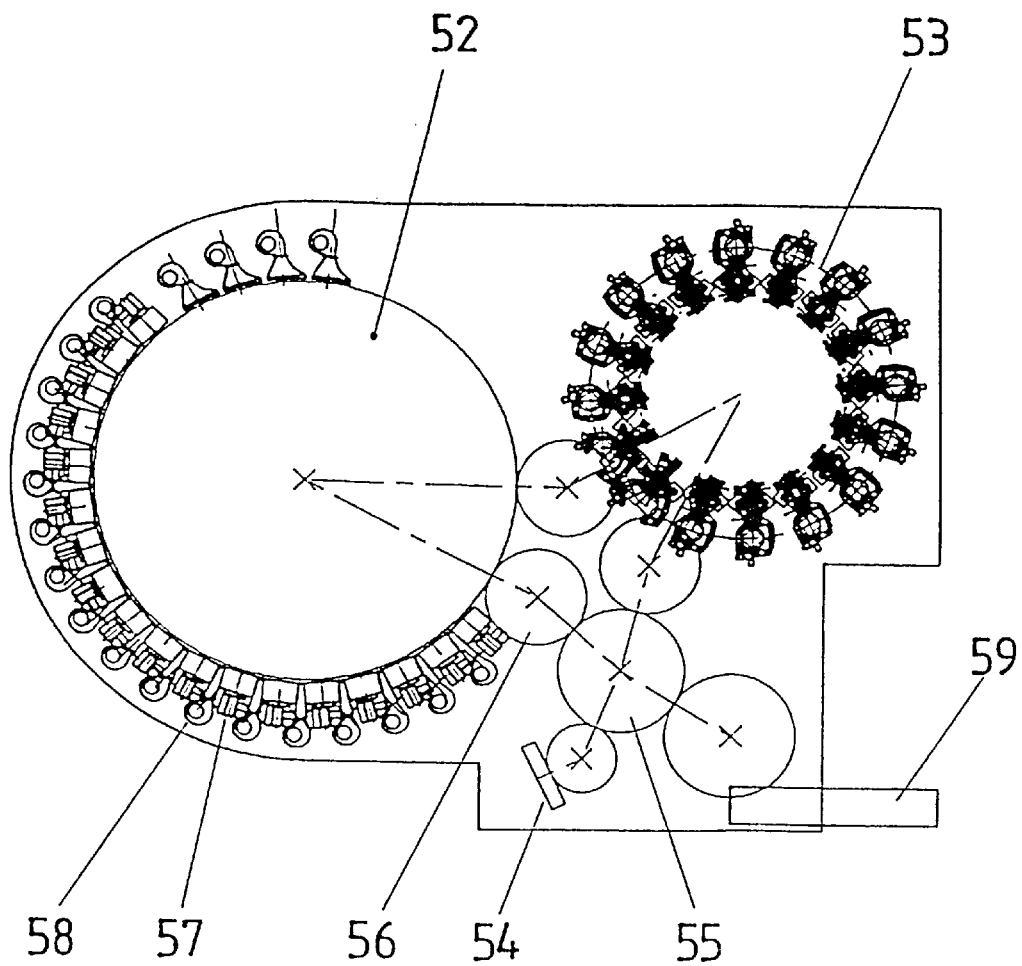
FIG. 5 is a sketch illustrating the fundamental structure of a device for blow-molding containers.

FIG. 5 show the fundamental structure of a blowing machine which is equipped with a rotating heating wheel (52) and a rotating blowing wheel (53). Proceeding from the issue of pre-forms (54), the pre-forms (1) are transported by means of transfer wheels (55, 56) into the area of the heating wheel (52). Heat radiators (57) and blowers(58) are located along the heating wheel (52) for tempering the pre-forms (1). After the pre-forms (1) have been sufficiently tempered, they are transferred to the flowing wheel (53), in the blow stations (33) are located. The completed blown containers (13) are guided by additional transfer wheels to the output stretch (59).

In order to be able to transform a pre-form (1) into a container (13) in such a manner that the container (13) shows material properties which guarantee the capability for long use with the container (13) filled with food, and especially beverages, special procedural steps must be observed in the heating and orientating of the pre-form (1). In addition, favorable effects can be achieved by observing special dimension requirements.

Various types of plastics can be employed as thermoplastic material. For example, PET, PEN or PP are suitable for use.

The dimensions of the pre-form (1) relative to the container (13) are designed in such a manner that a ratio of the container diameter (23) to the inner diameter (20) of the pre-form (1) will be selected to be greater than 4.0. The pre-form (1) has a wall thickness (18) in its wall area (5) of more than 3 millimeters. Preferably, the ratio of the container diameter (23) to the inner diameter (20) should be selected as greater than 5.0. A range of 5.2 to 5.8 has proved to be especially useful. In addition, with respect to the wall thickness (18) a dimension greater than 4 millimeters should be contemplated. An interval in the range of 4 millimeters to 5 millimeters has shown itself to be especially advantageous. Wall thickness (18) will be concretely determined as dependent on the volume of the container (13) to be produced.

With respect to the tempering of the pre-form (1), provision is made for the pre-form (1), in the area to be oriented, to be provided with a temperature, at least at the beginning of its orientation process, of greater than 70 degree Celsius. Temperatures greater than 80 degrees Celsius should particularly be contemplated. An interval of 85 degrees Celsius to 100 degrees Celsius has proven to be especially advantageous.

After the pre-form (1) has been transferred to the blowing station (33) the stretching rod (41) is moved into the interior space of the pre-form (11). After the stretching rod (41) reposes against the area of the bottom (7) of the pre-form (1), the stretching process begins. In the conduct of the stretching process, it is intended for the speed of stretching to be greater than 0.8 meter per second. An interval of 1.0 meters per second to 1.2 meters has been shown to be especially advantageous.

The expansion of the pre-form (1) during the orientation process is accomplished by means of supplying compressed air. The supply of compressed air is divided into a preliminary blowing phase in which the gas is fed at a low level of pressure and a subsequent primary blowing phase in which the gas is fed at a higher level of pressure. During the preliminary blowing phase, compressed air with a pressure in the interval of 10 bar to 25 bar is used and during the primary blowing phase compressed air with a pressure in the interval of 25 bar to 40 bar is supplied. The duration in time of the preliminary blowing phase amounts to a maximum of 1.0 seconds. During the preliminary blowing phase the container (13) to be produced will be expanded by at least 50 percent of its intended final volume. In special forms of the container (13) pressures of above 40 bar can be useful, so that in general a pressure of more than 25 bar is useful in the primary blowing phase.

Through the combination of stretching the pre-form (1) in the direction of the longitudinal axis (8) and the expansion caused by blown air at right angles to the longitudinal axis (8) a ratio of transverse stretching to longitudinal stretching greater than 1.2 is achieved. A ratio value greater than 1.5 has proved to be especially useful.

In order to carry out the crystallization of the oriented material a temperature of the blow mold (34) of between 150 degrees Celsius and 170 degrees Celsius should be provided. A value of approximately 160 degrees Celsius is especially favorable. This means that the crystallization temperature should be set at greater than 140 degrees Celsius.

In general it is useful for the blow mold (34) to be tempered at a temperature higher than that of the pre-form (1). However, it is noted that, the process described in the foregoing can also be carried out with a cold blow mold (34).

In order to ensure an exact contour of the container (13), provision is made for the blowing station (33) to be equipped with a form stop, which by means of a pneumatic pretension and despite the effective inner pressure during the primary blowing phase avoids the formation of a fissure in the area of the border surfaces of the form halves (35, 36).

After the stabilization process has been completed, the container (13) will show a degree of crystallization of greater than 30 percent. A crystallization degree from 35 to 40 percent is especially advantageous. Thus both a mechanical stretching and a thermal crystallization take place.

With respect to the tempering of the pre-form (1) provision is made for the temperature of the inner surface (9) to be greater than that of the outer surface (10). In order for an adequate tempering inside the wall of the pre-form (1) to occur, an equalizing period should be provided prior to transfer to the blowing station (33).

With respect to the duration of the preliminary blowing phase, a period of less than 0.5 seconds is envisioned. An interval value of 0.1 to 0.3 seconds has proved to be especially advantageous for this.

With respect to the expansion of the pre-form (1), it is especially intended for the container (13) to expand to at least 60 percent of its intended volume during the preliminary blowing phase. For this purpose an interval value of 70 to 90 percent has been shown to be especially favorable.

Figure 6:
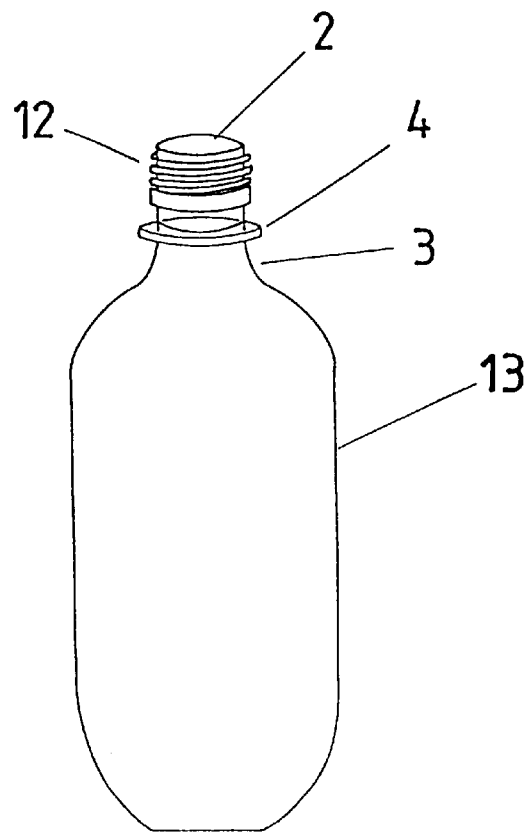
FIG. 6 is a side view of a blown container.
Figure 7:
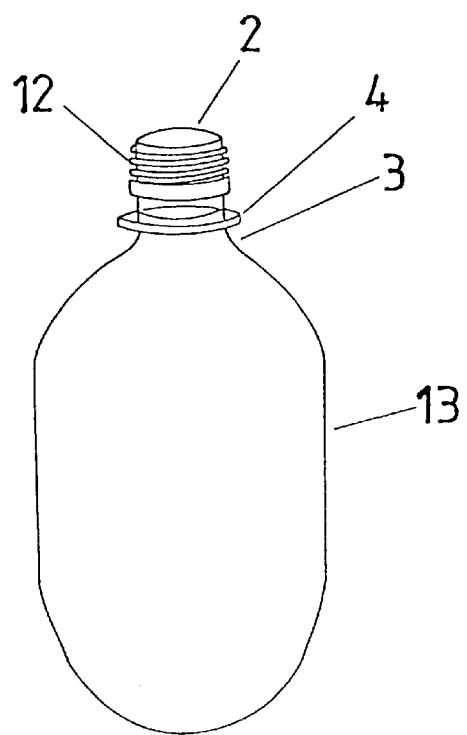
FIG. 7 is a side view of another container.

Some possible shapes for the containers (13) produced according to the process described are shown in FIG. 6 and FIG. 7. A volume of 0.2 liters to 0.7 liters is contemplated for these containers (13). It is especially intended that the containers (13) be produced so as to stand on their own through standing rings (26) or feet for standing in the form of outward chambering.

Figure 8:
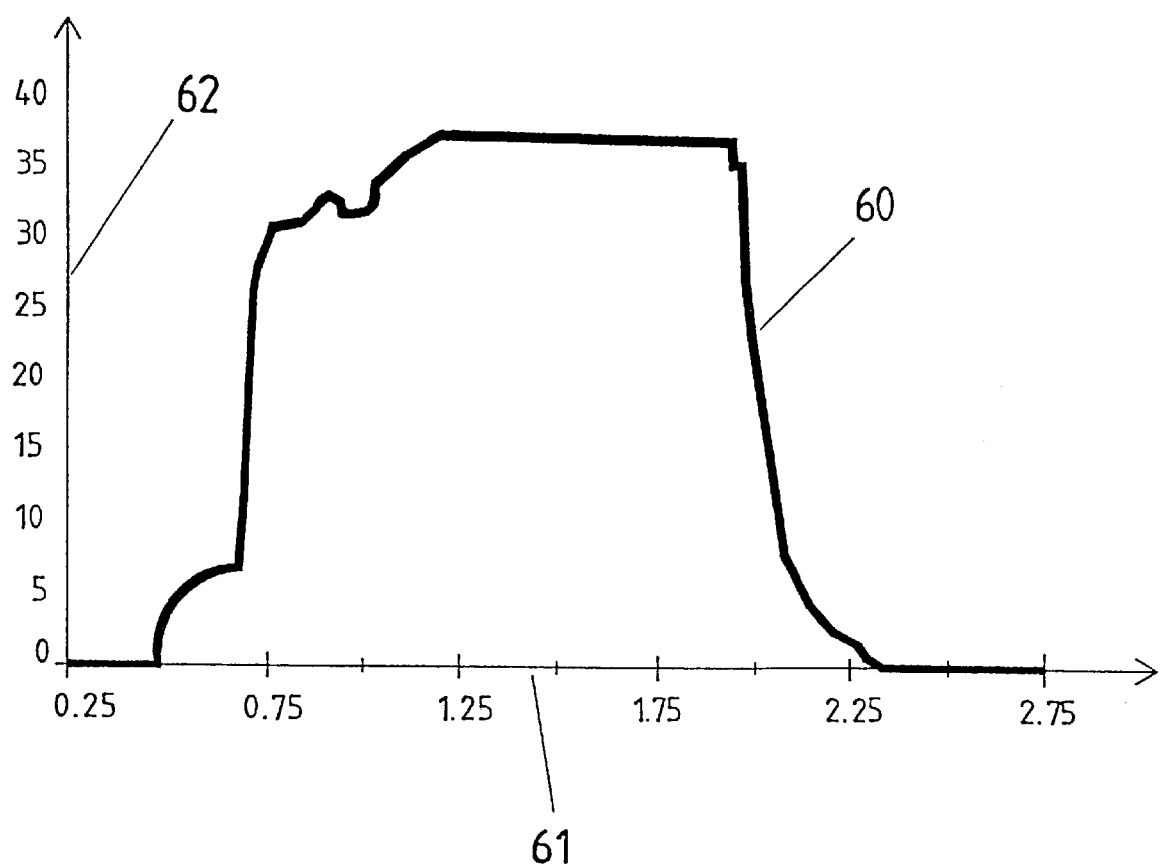
FIG. 8 is a time-pressure diagram illustrating the pressure sequence in the manufacture of containers.

FIG. 8 shows the pressure sequence in a pressure-time diagram during the reshaping of the pre-form (1) into the container(13). The pressure sequence (60) is indicated by a system of coordinates, which is comprised by a time axis (61) and a pressure axis (62). The time axis (61) is scaled in seconds and the pressure axis (62) in bar. It can be seen that the preliminary blowing phase is started approximately 0.5 second after the beginning of the production cycle. The preliminary blowing phase lasts some 0.2 to 0.25 second. After the primary blowing phase begins, pressure increases within the container (13) to be produced, strong at first, and then gradually proceeds into its final value by overlapping of the expansion process and by influx processes. After a satisfactory stability of the thermoplastic material has been reached through cooling off, the blow mold (34) is ventilated. The primary blowing phase lasts approximately 1.25 seconds and provision is made for the ventilation to occur in a period of an interval of 0.3 second to 0.4 second.

The process in accordance with the present invention can also be used in the production of temperature-stable containers. The procedural steps for achieving temperature stabilization are also termed a heat-set process. In order to stabilize temperature, the container (13) is expanded in a heatable blow mold (34). It is possible, for example, to heat the walls, a bottom insert and a screw tread of the blow mold (34) separately.

The mold temperature will typically amount to 150° C. to 170° C. Especially advantageous will be some 160° C. The bottom insert will typically be tempered at 130° C. By this means it is ensured that a milk-like crystallization of unoriented areas of the container bottom or inadequately oriented areas will be avoided.

After the wall of the container (13) reposes against the heated blow mold (34) and after sufficient crystallization has taken place, cool air is introduced into the inside of the container (13) through a hollow stretching rod (41). This cooling should preferably take place after an escape valve for the discharge of the inside pressure prevailing in the container (13) has been opened. In order to assure durability of shape until the material has sufficiently cooled off, an adequately high reduced inner pressure is maintained. By means of suitable outlet apertures in the stretching rod (41) it is possible to guide the cooling air into certain areas of the inner wall of the container (13). This process is especially suitable of making filling temperature possible of greater than 95° C., without fearing disruptive malformations of the container (13).

The steps described in the above for ensuring a high temperature stability are also suitable, in combination with the procedural steps as described in the foregoing, for causing additional improvement of the barrier properties of the materials used.

What is claimed is:

1. A process for producing containers, in which a heated pre-form made of a thermoplastic material is stretched and is inflated by means of a gas under pressure and an inflation sequence is divided into a preliminary blowing phase with a gas under a lower level of pressure and a subsequent primary blowing phase with a gas under a higher level of pressure, characterized by the fact that the ratio of the container diameter (23) to the inner diameter (20) of the pre-form (1) is selected to be more than 5.0, that the pre-form (1) has a median wall thickness (18) of more than 4 millimeters, that at least at the beginning of the preliminary blowing phase a material temperature of the area to be stretched is between 85 and 100 degrees Celsius, that the pre-form, at least at the beginning of the preliminary blowing phase in the area to be stretched has an outer surface temperature which at the maximum is equal to an inner surface temperature, that the temporal duration of the preliminary blowing phase is selected to be less than 0.5 seconds, that during the preliminary blowing phase the pre-form (1) is expanded to at least 60 percent of the volume intended for the finished container (13), that the pre-form is stretched at a stretching speed greater than 0.8 meter per second and that the finished blown container has a crystallinity greater than 30% and wherein a form stop working against the release of power of the compressed gases is provided to avoid contour deviations in the container (13) in the area of a blowing station (33) provided for shaping the container.

2. A process according to claim 1, characterized by the fact that the ratio has a value in the interval of 5.2 to 5.8.

3. A process according to claim 1, characterized by the fact that a value of 4.0 millimeters to 5.0 millimeters for the median wall thickness (18) is selected.

4. A process according to claim 1, characterized by the fact that for the time period a value in the interval of 0.1 second to 0.3 second is selected.

5. A process according to claim 1, characterized by the fact that an expansion to a volume share in the region of 70 percent to 90 percent is provided for within the preliminary blowing phase.

6. A process according to claim 1, characterized by the fact that a value in the interval of 35 percent to 40 percent is selected for the crystallinity.

7. A process according to claim 1, characterized by the fact that an equalizing period will be provided for equalizing the outer surface temperature with the inner surface temperature.

8. A process according to claim 1, characterized by the fact that a value in the interval of 1.0 to 1.2 meters per second is selected for the stretching speed.

9. A process according to claim 1, characterized by the fact that both a mechanical stretching and a thermal crystallization will take place.

10. A process according to claim 9, characterized by the fact that a crystallization temperature greater than 140 degrees Celsius will be selected.

11. A process according to claim 9, characterized by the fact that for the crystallization a molding temperature of a blow mold (34) of 150 degrees Celsius to 170 degrees Celsius will be selected for the contouring of the container.

12. A process according to claim 11, characterized by the fact that for the molding a temperature of approximately 160 degrees Celsius will be selected.

13. A process according to claim 1, characterized by the fact that a ratio of traverse stretching to longitudinal stretching of greater than 1.2 will be selected.

14. A process according to claim 13, characterized by the fact that the ratio of transverse stretching to longitudinal stretching has a value greater than 1.5.

15. A process according to claim 1, characterized by the fact that the pressure during the preliminary blowing phase has a value in the interval of 10 bar to 25 bar.

16. A process according to claim 1, characterized by the fact that the pressure during the primary blowing phase has a value in the interval of 25 bar to 40 bar.

* * * * *